United States Patent
Nakajima et al.

(10) Patent No.: US 8,668,332 B2
(45) Date of Patent: Mar. 11, 2014

(54) TORIC CONTACT LENS AND METHOD FOR MANUFACTURING THE SAME

(75) Inventors: Takaharu Nakajima, Tokyo (JP); Naoki Tsuji, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/511,562

(22) PCT Filed: Sep. 3, 2010

(86) PCT No.: PCT/JP2010/065158
§ 371 (c)(1),
(2), (4) Date: May 23, 2012

(87) PCT Pub. No.: WO2011/077786
PCT Pub. Date: Jun. 30, 2011

(65) Prior Publication Data
US 2012/0242952 A1    Sep. 27, 2012

(30) Foreign Application Priority Data
Dec. 22, 2009    (JP) .................. 2009-291082

(51) Int. Cl.
*G02C 7/04* (2006.01)
*G02C 7/06* (2006.01)

(52) U.S. Cl.
USPC ............ 351/159.36; 351/159.17; 351/159.19; 351/159.21; 351/159.33

(58) Field of Classification Search
CPC ................................ G02C 7/041; G02C 7/048
USPC ............ 351/159.17, 159.19, 159.21, 159.36, 351/159.38
See application file for complete search history.

(56) References Cited

U.S. PATENT DOCUMENTS

| | | | |
|---|---|---|---|
| 2002/0024631 A1 * | 2/2002 | Roffman et al. | 351/161 |
| 2004/0017542 A1 * | 1/2004 | Lindacher et al. | 351/160 R |
| 2006/0055884 A1 | 3/2006 | Molinari et al. | |

FOREIGN PATENT DOCUMENTS

| | | |
|---|---|---|
| JP | U-50-133151 | 11/1975 |
| JP | A-11-174388 | 7/1999 |
| JP | A-2004-506925 | 3/2004 |
| JP | A-2008-508567 | 3/2008 |
| WO | WO 01/75509 A1 | 10/2001 |
| WO | WO 2006-013101 A2 | 2/2006 |
| WO | WO 2009/047411 A2 | 4/2009 |

OTHER PUBLICATIONS

International Search Report issued in International Patent Application No. PCT/JP2010/065158 dated Oct. 19, 2010 (with translation).
May 21, 2013 Office Action issued in Chinese Patent Application No. 201080059418.X (with translation).

* cited by examiner

*Primary Examiner* — Darryl J Collins
(74) *Attorney, Agent, or Firm* — Oliff PLC

(57) ABSTRACT

A toric contact lens having a prism ballast structure, wherein a center optical area, an annular transition area surrounding the center optical area determining a refractive degree, and an annular peripheral area surrounding the transition area, are defined on a lens front surface. A shape of the lens front surface has a mirror symmetry with a vertical meridian as a boundary, in such a manner that a thickness is smoothly decreased toward a lens lower end portion from two maximum thickness portions and where the thickness of the lens is maximum, and a valley-shaped slab-off is formed between these maximum thickness portions.

12 Claims, 9 Drawing Sheets

(a)

(b)

TORIC CONTACT LENS AND METHOD FOR MANUFACTURING THE SAME

BACKGROUND OF THE INVENTION

1. Technical Field

The present invention relates to a toric contact lens, and particularly relates to the toric contact lens and a method for manufacturing the same, capable of stabilizing a directivity of a lens (preventing rotation of the lens) on a cornea during wearing the lens.

2. Description of Related Art

Usually, astigmatism indicates a state that lights emitted from one point of an outer field are not converged to one point in an eye, due to a different curvature radius between a vertical direction and a horizontal direction of the eye, when a shape of a cornea or a crystalline lens is not a clear spherical surface, and a toric contact lens is generally known as a soft contact lens for correcting the astigmatism.

The toric contact lens needs to be always worn in a direction determined for the eyeball in terms of a nature of the astigmatism. Namely, a portion intended to be a top (upper end portion) of the lens must be always positioned at a top (upper end portion) of a wearer. For example, a visual acuity becomes easily unstable if a contact lens is rotated by a blink (closing action of an eyelid) during wearing to thereby deviate an astigmatic axis of the toric contact lens. Therefore, a method for preventing a rotation of the toric contact lens or stabilizing an axis, is employed. As such a method, methods such as prism ballast and slab-off are given as examples.

As an example of employing the prism ballast, patent document 1 discloses a toric contact lens having a prism ballast structure which is formed so that a thickness is increased toward a lens lower end along an up and down lines parallel to a vertical meridian. In this example, the thickness is designed to be substantially uniform in a horizontal direction vertical to the vertical meridian. With this structure, rotation of the lens is prevented and a wearing feeling is improved. Further, as an example of employing the slab-off, patent document 2 discloses a toric contact lens with a flat portion provided on a peripheral part of a lens, having a mirror image symmetry with respect to a horizontal axis passing through a middle point of the lens, in such a manner that a portion of a vertical axis orthogonal to a horizontal axis is formed to be thinnest, and the thickness is gradually increased along the flat portion to both sides from the vertical axis, so that a horizontal axis portion is set as a maximum thickness portion, to thereby achieve a dynamic stability of the axis.

Patent Document 1: Japanese Unexamined Patent Application Publication No. 2004-506925

Patent document 2: unexamined utility model application publication No. 1975-133151

Incidentally, the toric contact lens disclosed in the aforementioned patent document 1 has the prism ballast structure in which the thickness is increased from an upper end to a lower end in an outside zone, with a difference of the thickness being remarkable from a lower end portion to a lower side edge in an inside zone. As the thickness of the lower end portion of the toric contact lens is increased, rotation of the lens occurs easily every time a wearer blinks when the toric contact lens is worn by a person whose lower portion of a cornea is swelled, and directivity of the lens becomes unstable, thus making it difficult to achieve good axis stability and making it impossible to sufficiently satisfy with a wearing feeling. Further, in the toric contact lens disclosed in the aforementioned patent document 2, although good wearing feeling can be obtained, the lens is rotated on the cornea every time the wearer blinks, because a center balance of the lens exists at a geometric center, thus making it difficult to obtain the axis stability.

SUMMARY OF THE INVENTION

In view of the above-described circumstance, the present invention is provided, and an object of the present invention is to provide a toric contact lens and a method for manufacturing the same capable of obtaining good axis stability and wearing feeling.

As a result of strenuous efforts by inventors of the present invention, for obtaining a method for making both axis stability and wearing feeling compatible, it is found that the axis stability is effectively exhibited and good wearing feeling can be obtained by forming two maximum thickness portions on a front surface of a lens having mirror image symmetry, and by smoothly decreasing the thickness toward a lens lower end portion from two maximum thickness portions respectively, thereby forming a valley-shaped recess between the maximum thickness portions.

In order to solve the above-described problem, the present invention has the following structures.

Namely, according to the present invention, there is provided a toric contact lens, comprising:

a convex-shaped lens front surface and a concave-shaped lens back surface; and a prism ballast structure in which a thickness is gradually increased from a lens upper end portion to a lens lower end portion, wherein a center optical area determining a refractive degree, an annular transition area surrounding the center optical area, and an annular peripheral area surrounding the transition area are defined on the lens front surface, and a shape of the lens front surface has a mirror image symmetry with respect to a vertical radial line as a boundary from the lens upper end portion to the lens lower end portion passing through a lens middle point, wherein two maximum thickness portions where the lens thickness becomes maximum are formed on a lower side of the lens middle point of the lens front surface, in such a manner that the thickness is smoothly decreased toward the lens lower end portion from these two maximum thickness portions, and a valley-shaped recess is formed between these two maximum thickness portions.

Preferably, according to the present invention, there is the toric contact lens, wherein an angle measured in a circumferential direction of the lens from these two maximum thickness portions to the lens lower end portion is in a range of 15° to 35°.

Further preferably, variation of the thickness that decreases from the maximum thickness portions to the lens lower end portion is defined by Cos function.

Still further preferably, the prism ballast structure is formed by offset of a central axis line of the lens front surface downward with respect to a central axis line of the lens back surface.

Preferably, there is provided the toric contact lens, wherein the center optical area is set in a bifocal shape or in a multifocal shape.

Further preferably, the toric contact lens is made of a hydrogel material or a silicone hydrogel material.

According to the present invention, two maximum thickness portions are formed on the lens front surface having a mirror image symmetry, with its thickness smoothly decreased from the two maximum thickness portions to the lens lower end portion, and a valley-shaped recess is formed between these maximum thickness portions. As a result, an effect of axis stability due to a cornea shape of a wearer can be reduced, and the stability of an axis of the toric contact lens can be improved. Further, good wearing feeling can be obtained by forming the valley-shaped recess on the lens lower end portion.

BRIEF DESCRIPTION OF THE DRAWINGS

FIG. 2 is a view showing a deviation of central axis lines of a lens front surface and a lens back surface of this contact lens, wherein FIG. 2(a) is a view showing the deviation of center optical areas of the lens front surface and the lens back surface viewed from a front of the lens, and FIG. 2(b) is a cross-sectional view along a vertical meridian of this contact lens.

FIG. 3 is a view for describing a cross-sectional profile on a prescribed angle meridian in this contact lens, wherein FIG. 3(a) is a front view of a lens for showing each part to be described, and FIG. 3(b) is a view showing the cross-sectional profile on each angle meridian shown in FIG. 3(a).

FIG. 5 is a view for describing a thickness distribution on a circumference A of this contact lens, wherein FIG. 5(a) is a thickness distribution view when the thickness is increased based on Cos function from point P1 to point P2, and FIG. 5(b) is a thickness distribution view when the thickness is increased based on linear function from point P1 to point P2, FIG. 5(c) is a thickness distribution view when the thickness is increased based on quadratic function from point P1 to point P2, and FIG. 5(d) is a thickness distribution view when the thickness is increased based on root function from point P1 to point P2.

FIG. 6 is a view for describing the thickness of the lens lower end portion of this contact lens, wherein FIG. 6(a) is a schematic view viewed from a front surface in the vicinity of the lens lower end portion, and FIG. 6(b) is a view showing a variation of the thickness in cross-section along each line of TH1 to TH4 shown in FIG. 6(a).

DETAILED DESCRIPTION OF THE INVENTION

The aforementioned object, characteristic, and advantage of the present invention will be further clarified from the detailed description of the following embodiments based on the drawings. Therefore, the embodiments of the present invention will be described hereafter, with reference to the drawings.

Figure 1:
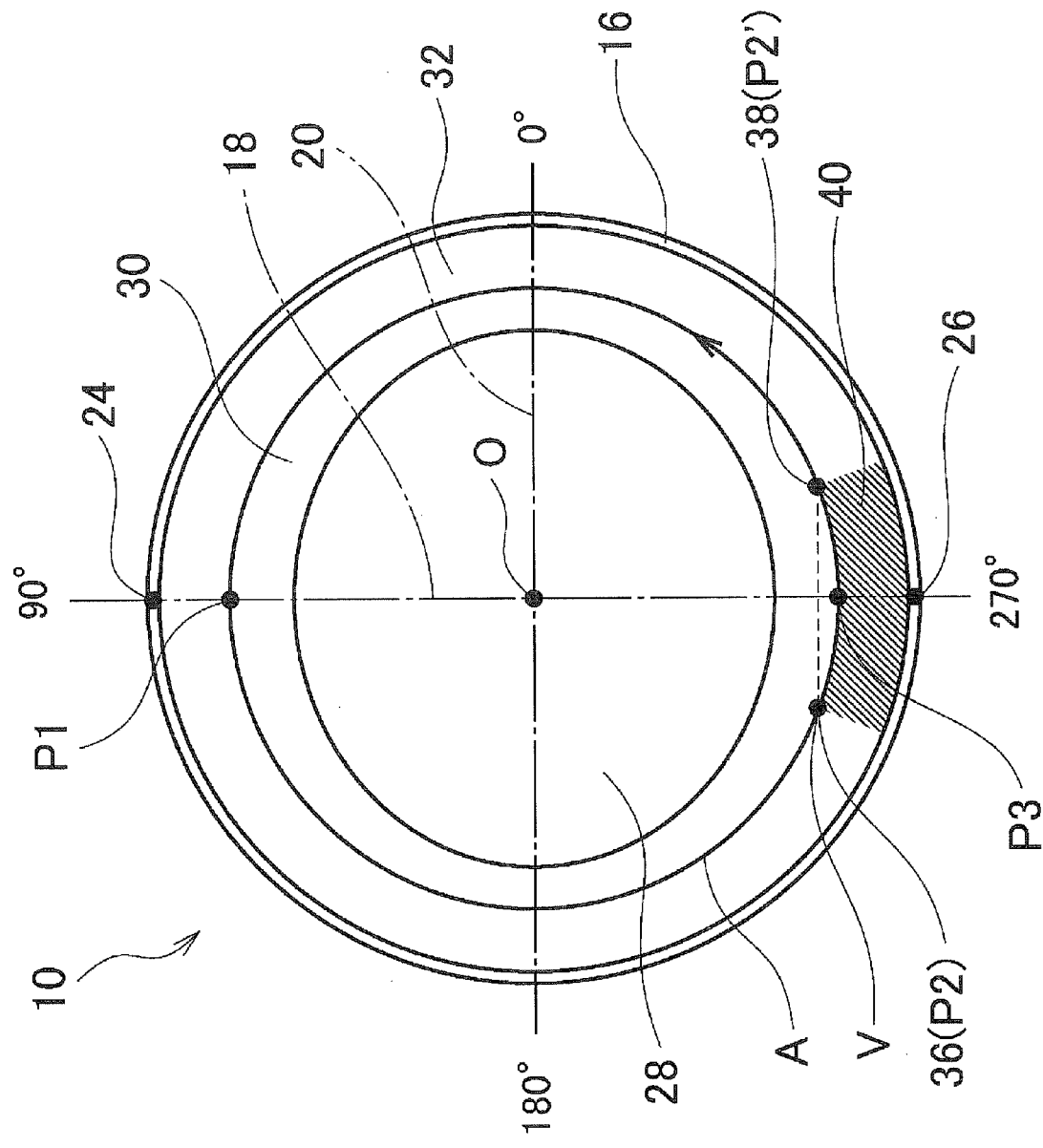
FIG. 1 is a front view showing a structure of a toric contact lens according to an embodiment of the present invention.
Figure 2:
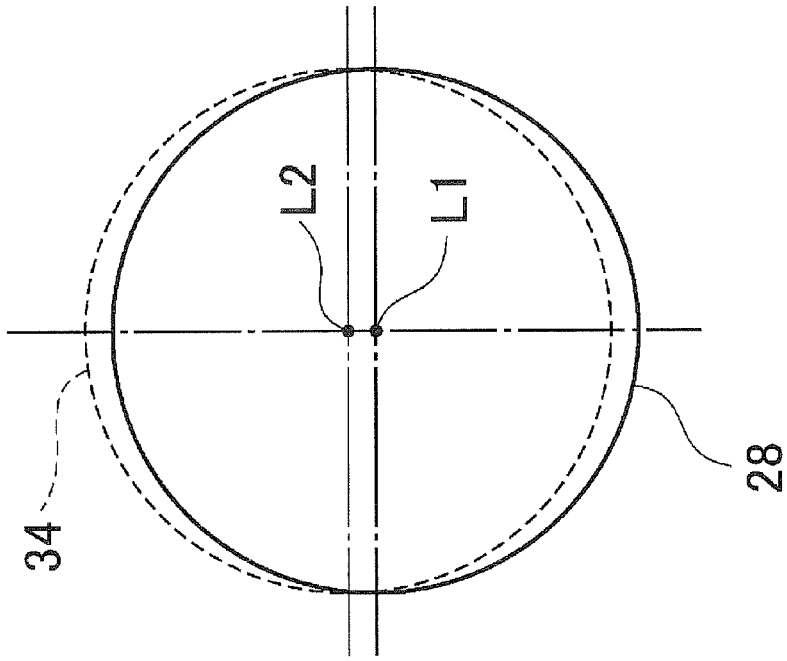
Figure 2:
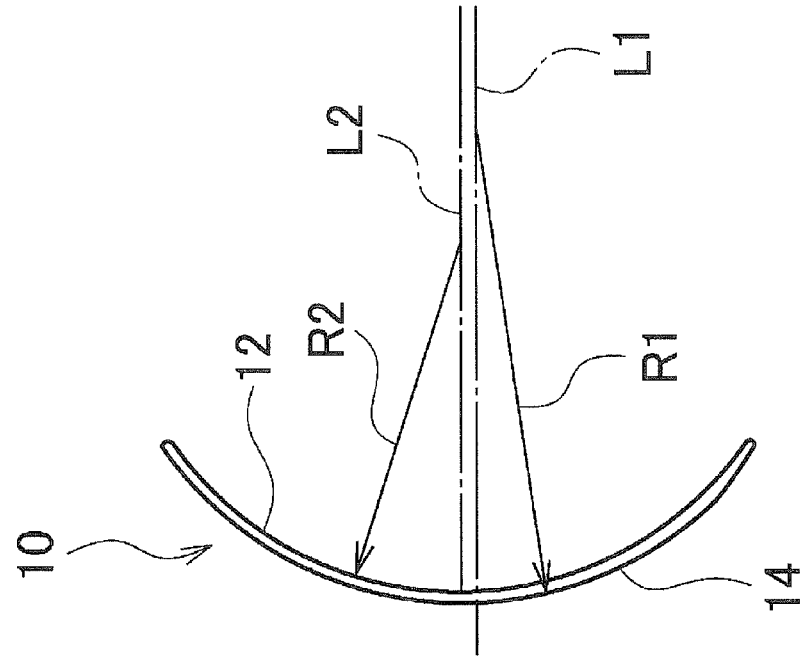

As shown in FIG. 1, FIG. 2A, and FIG. 2B, the toric contact lens 10 is formed by a concave-shaped lens back surface (also called a base curve) 12, and a convex-shaped lens front surface (also called a front curve) 14. An edge 16 is formed at a part where the base curve 12 and the front curve 14 are crossed each other (joined with each other). As parameters of the toric contact lens 10, diopter of shortsightedness: −3.00D, diopter of astigmatism: −5.0, and axis: 180° are given.

The base curve 12 is formed into a rotationally symmetric shape having a multi-stage curve corresponding to a shape of a cornea of a wearer. Namely, the same shape (concentric shape) is shown as the shape of the base curve 12 even if being cut by any angle meridian.

The meridian means a cross line of a lens surface (base curve 12 or front curve 14) and a plane including a lens central axis line. A vertical meridian 18, a horizontal meridian 20, and an angle meridian line 22 are given as the kind of the meridian. The vertical meridian 18 means the meridian passing a lens upper end portion 24 and a lens lower end portion 26, and the horizontal meridian 20 means the meridian orthogonal to the vertical meridian 18, and the angle meridian 22 is the meridian of an arbitrary angle around a middle point O of a lens (namely, line radially extending along a radial direction of a lens toward the edge 16 from the middle point O of the lens). Note that the angle meridian 22 will be more specifically described later.

The front curve 14 has a mirror image symmetry with the vertical meridian 18 as a boundary extending to the lens lower end portion 26 from the lens upper end portion 24 passing through the middle point O of the lens. Namely, a right half and a left half divided by the vertical meridian 18 passing the middle point O of the lens, is formed into the same shapes. Therefore, the lens can be used for both the right and left eyes.

In the front curve 14, a center optical area 28 for defining a refractive degree of the toric contact lens 10, an annular transition area 30 surrounding the center optical area 28, and an annular peripheral area 32, being a lens outermost peripheral area surrounding the transition area 30, are defined. The edge 16 where the base curve 12 and the front curve 14 are crossed each other, is provided on the outer peripheral side of the peripheral area 32.

The center optical area 28 of the front curve 14 is formed as a toric surface. Namely, in order to correct astigmatism, a curved surface (toric surface) is formed so that a curvature radius is different in two orthogonal meridian directions.

Here, explanation is given for a case that the center optical area 28 is formed as the toric surface, which is also explained in examples as will be described later. However, the center optical area 28 can also be set in any shape for the purpose of correcting a visual acuity, and can be set in a bifocal shape or a multifocal shape.

The transition area 30 connects an elliptical center optical area 28 and an annular peripheral area 32 by a shortest distance as a buffer area between the center optical area 28 and the peripheral area 32. By providing this transition area 30, an excessive frictional force is reduced, which is generated between upper/lower eyelids which are touched on each other during wearing, to thereby improve the wearing feeling.

The toric contact lens 10 has a prism ballast structure. Specifically, as shown in FIG. 2(a) and FIG. 2(b), a central axis line L1 of the center optical area 28 (solid line) of the front curve 14 is offset downward with respect to a central axis line L2 of the center optical area 34 (dot line) of the base curve 12, to thereby form the prism ballast structure in which the thickness is gradually increased toward the lens lower end portion 26 from the lens upper end portion 24. As a result, the rotation of the lens can be prevented by eccentricity of the lens so that a lower portion of the lens is thicker than an upper portion of the lens. Note that myopia degrees of the toric contact lens 10 are determined by curvature R1 of the center optical area 28 and curvature R2 of the center optical area 34.

Figure 3:
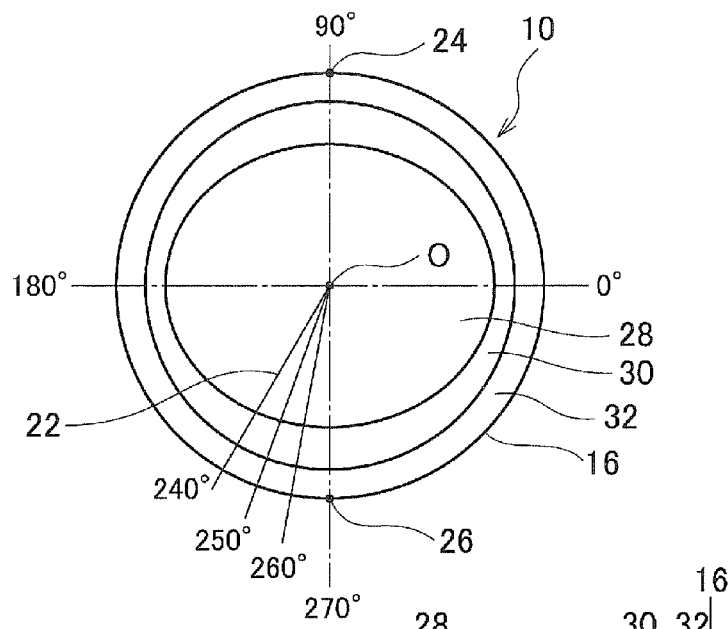
Figure 3:
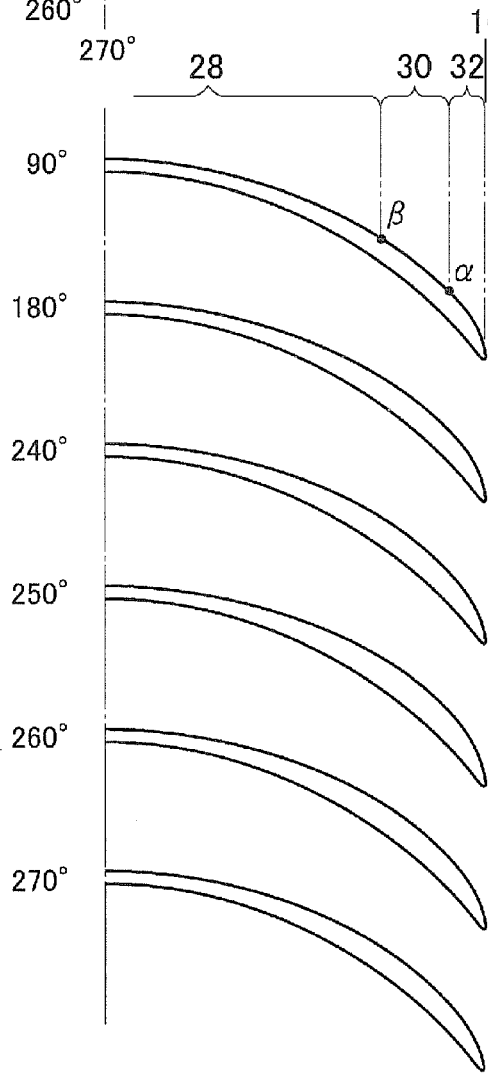

As shown in FIG. 3(a), angle positions of the toric contact lens 10 used in the following explanation are defined as follows: the lens upper end portion 24 is positioned at 90°, the lens lower end portion 26 is positioned at 270°, a nose side direction of the horizontal meridian 20 is positioned at 0°, and an opposite side (ear side) of this direction is positioned at 180°.

FIG. 3(b) shows a lens cross-sectional profile divided by each angle meridian 22 from the middle point O of the lens, wherein thickness S is increased to be maximum from the transition area 30 to the peripheral area 32. Specifically, the thickness is increased at 250°, because there is a larger distance between the base curve 12 and the front curve 14 from the edge 16 to the peripheral area 32. In other words, it is found from each cross-section at the angle meridian line 22, that a maximum thickness portion is formed in a range from point α, being a contact point of the peripheral area 32 and the transition area 30, to point β, being a contact point of the center optical area 28 and the transition area 30.

Further, point α is positioned in a prescribed distance from the edge 16 at any angle. Meanwhile, point β is varied at every angle in accordance with the shape of the center optical area 28. Specifically, in a case of the toric contact lens 10 with an axis of 180 degrees, the distance between point α and point β becomes maximum at position 90° (P1) and position 270° (P3), and becomes minimum at position 0° and position 180°. Thus, the transition area 30 functions as the buffer area.

Further, since the toric contact lens 10 has the mirror image symmetry, the thickness distribution is uniform in each angle meridian line 22, from 90° to 270° counterclockwise, and from 90° to 270° clockwise. Namely, if each of the angle meridians 22 is radially cut from the middle point O of the lens, it is found that the right and left cross-sectional shapes are the same. Specifically, 0° and 180° are the same, and 250° and 290° are the same.

Figure 4:
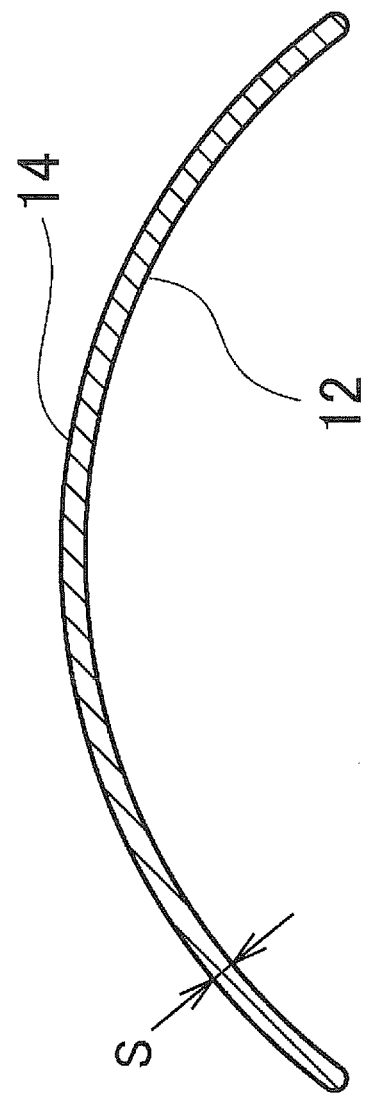
FIG. 4 is a cross-sectional view showing how to define a thickness of this contact lens.

Wherein, how to define the thickness will be described, with reference to FIG. 4. The thickness S of the lens is defined as a distance from an arbitrary point on the base curve 12 to a point where a perpendicular line orthogonal to a tangent line at the arbitrary point is crossed with the front curve 14. The thickness S in the center optical area 28 is defined corresponding to the diopter for correcting the visual acuity, and meanwhile the thickness S in the transition area 30 and the peripheral area 32 excluding the center optical area 28 can be changed to a desired value.

Figure 5:
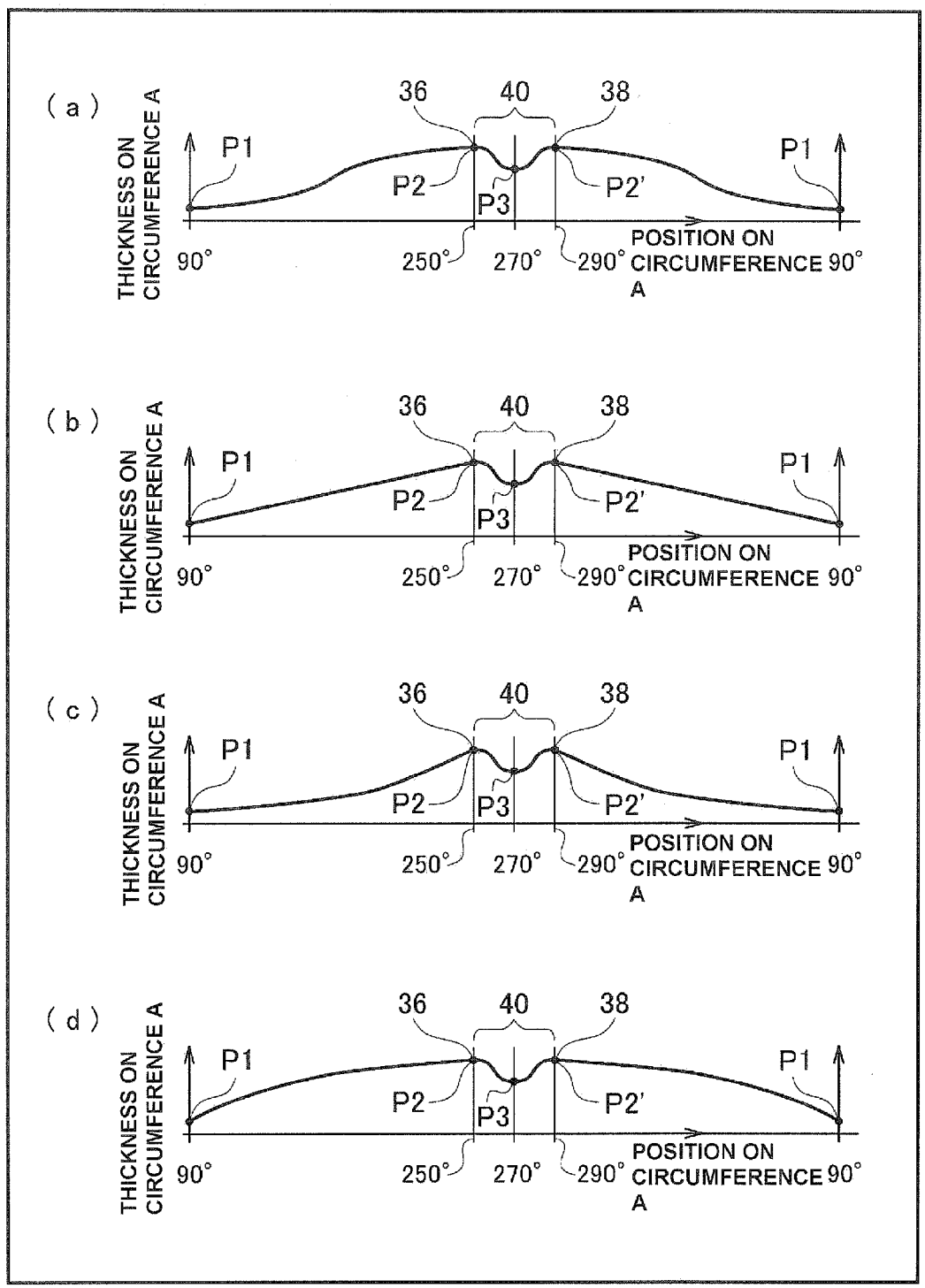

As shown in FIG. 5(a), the thickness on a circumference A, being the boundary between the transition area 30 and the peripheral area 32 is different in each area divided by a specified angle. Specifically, the thickness is increased based on Cos function from point P1 (90°) to point P2 (250°), and is decreased based on Cos function from point P2 (250°) to point P3 (270°). Namely, the thickness divided by the position of 250° becomes maximum.

In the toric contact lens 10 having the mirror image symmetry, the thickness is gradually increased from point P1 (90°) to point P2' (290°) passing through 0° clockwise, and is gradually decreased from point P2' (290°) to point P3 (270°). Namely, when the toric contact lens 10 is divided by each angle meridian line 22, the thickness of a portion divided by 250° and 290° becomes maximum. Wherein, the maximum thickness portion at a position of 250° is called a maximum thickness portion 36, and the maximum thickness portion at a position of 290° is called a maximum thickness portion 38.

Note that explanation is given for a case that the thickness is increased based on Cos function from point P1 to point P2, with reference to FIG. 5(a). However, any kind of shape can be employed, provided that the thickness is increased from point P1 to point P2, and for example linear function as shown in FIG. 5(b), quadratic function as shown in FIG. 5(c), and root function as shown in FIG. 5(d) can also be employed.

In FIG. 5(a) again, the thickness is decreased from point P2 (250°) to point P3 (270°) counterclockwise, and from point P2' (290°) to point P3 (270°) clockwise. Thus, slab-off 40 (shaded area shown in FIG. 1) is formed in a range divided by 250° to 290° counterclockwise along the angle meridian line 22 from the middle point O of the lens. Owing to a decrease of the thickness from 250° to 270° counterclockwise (from 290° to 270° clockwise) based on Cos function, point P3 is recessed in a valley-shape interposed between the maximum thickness portion 36 and the maximum thickness portion 38. As a result, the toric contact lens 10 is fitted in to the cornea even if the lower portion of the cornea is swelled, and therefore good fitting of the lens into the cornea with good wearing feeling can be achieved.

Figure 6:
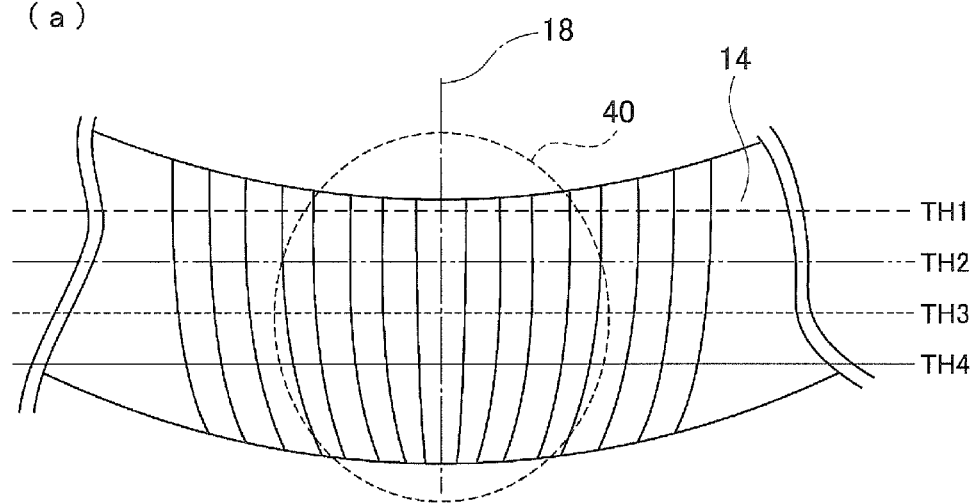
Figure 6:
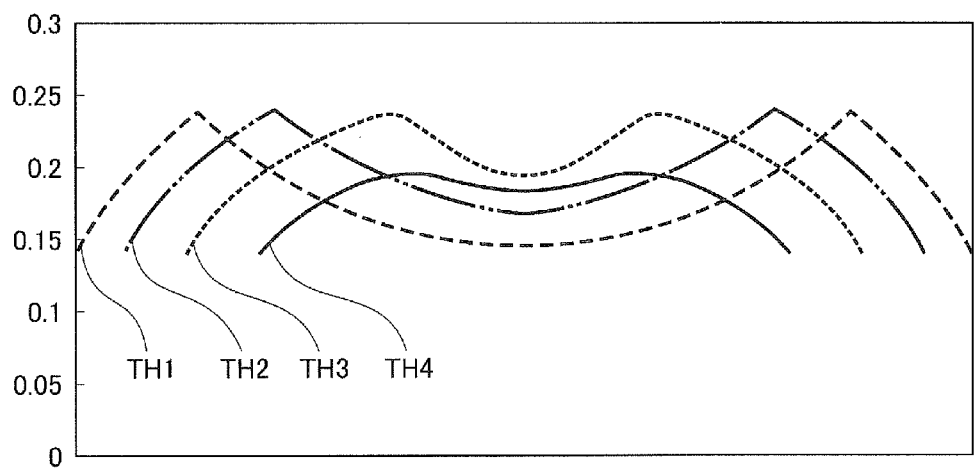

As shown in FIG. 6(a), thickness variation curves TH1 to TH4 shown in FIG. 6(b) show sectional faces of cutting plane lines TH1 to TH4 respectively, when the slab-off is divided into equal intervals in parallel with the horizontal meridian 20 (see FIG. 1). Thus, all thicknesses at each cutting line TH1 to TH4 are swelled once from an end portion to a center portion respectively, and thereafter are swelled down. In other words, the thickness is increased in each angle meridian 22 from the lens upper end portion 24 to right and left maximum thickness portion 36 and maximum thickness portion 38, and the thickness is decreased in each angle meridian 22 from these maximum thickness portion 36 and maximum thickness portion 38 to the lens lower end portion 26, thus forming a thickness distribution in which a valley-shaped cross-sectional shape is formed, with the thickness recessed near the center (position of 270°) as shown in TH1 to TH4. Thus, valley V of the slab-off 40 is formed.

The valley V shows an interval between the maximum thickness portion 36 at a position of 250°, and the maximum thickness portion 38 at a position of 290°. Probably, a desired axis is hardly deviated even if the lower portion of the cornea is depressed. Note that the valley V has preferably a length of 3 to 7 mm, and further preferably a length of 4.5 to 6.5 mm. If the valley V has a length of below 3 mm, an area for fitting the lens into the cornea and the upper and lower eyelids becomes narrow, and therefore when the wearer blinks, a friction generated by the slab-off 40, the maximum thickness portion 36, the maximum thickness portion 38, and the upper and lower eyelids, can't be effectively exhibited, and as a result, the deviation of the axis is increased. Meanwhile, when the valley V has a length of beyond 7 mm, the area for fitting the lens into the cornea and the upper and lower eyelids is widened, and therefore when the wearer blinks, the friction generated by the slab-off 40, the maximum thickness portion 36, the maximum thickness portion 38, and the upper and lower eyelids can't be effectively exhibited, and as a result, the deviation of the axis is increased.

In FIG. 1 again, when angles are measured in a circumferential direction of the lens from the lens lower end portion 26 (position of 270°), it is found that positions of 250° and 290° are development angles. Since the development angle of the slab-off 40 is ±20°, a balance of axis stability and wearing feeling can be maintained. In this embodiment, explanation is given for a case that positions of ±20° from 270° (the lens lower end portion 26) are used as the positions where the maximum thickness portion 36 and the maximum thickness portion 38 are provided. However, positions of 225° to 255° (−15° to −35°) and positions of 285° to 305° (+15° to +35° from the lower end portion) are practically usable range.

Namely, when the development angle of the slab-off 40 is widened to be larger than ±40° (230° to 310°), the area fitted in to the lower portion of the cornea is widened, and therefore the axis is easily deviated every time the wearer blinks, and the axis stability becomes insufficient. Meanwhile, when the development angle of the slab-off 40 is narrowed to less than ±10° (260° to 280°), the lens is hardly fitted in to the lower portion of the cornea, thus reducing the axis stability.

Explanation is given for a case that the thickness from point P2 to point P3 is decreased based on Cos function. However, if the thickness from point P2 to point P3 is decreased based on liner function, the shape of the slab-off 40 as will be described later is easily loosened, thus damaging the axis stability.

The thickness at the position of 90° on the circumference A is preferably set in a relation of "thickness of the maximum thickness portion:thickness of the lens upper end portion=2.27-2.54:1", with respect to the thickness at the position of 250° on the circumference A (the maximum thickness portion 36) and the thickness at the position of 290° on the circumference A (the maximum thickness portion 38). If the thickness is outside of this range, the wearing feeling and the axis stability are reduced.

Further, the thickness at the position of 270° on the circumference A is preferably set in a relation of "thickness of the maximum thickness portion:thickness of the lens lower end portion=1-1.27:1", with respect to the thickness at the position of 250° on the circumference A (the maximum thickness portion 36) and the thickness at the position of 290° on the circumference A (the maximum thickness portion 38). If the thickness is outside of this range, the wearing feeling and the axis stability are reduced.

Further, the thickness at the position of 90° on the circumference A is preferably set in a relation of "thickness of the maximum thickness portion:thickness of the lens lower end portion=1-2.27:1", with respect to the thickness at the position of 270° on the circumference A. If the thickness is outside of this range, the wearing feeling and the axis stability are reduced.

Note that central axes of the base curve 12 and the front curve 14 may coincide with each other.

Further, as a base material of the contact lens used for manufacturing the toric contact lens 10, it is acceptable to use a polymer capable of holding the shape of the contact lens and capable of being hydrogel after polymerization, or preferably a polymer containing silicone to become hydrogel, and a silicone hydrogel material which is conventionally known as the base material of a soft contact lens, can be used as it is. Further, the toric contact lens 10 is polymerized by a cast molding technique, and as a material of a molding die at this time, any one of the material can be used, provided that it has a resistance to a monomer mixed solution, and polypropylene can be given for example.

Examples

Nine experiments in which the toric contact lens according to examples is worn by a wearer, will be specifically described hereafter. Table 1 shows characteristics of examples 1 to 4, and comparative examples 1 to 5, and table 2 shows parameters common to each of the toric contact lenses used in examples 1 to 4 and comparative examples 1 to 5.

TABLE 1

| | Characteristics | | | |
|---|---|---|---|---|
| | Lower development angle | Maximum thickness portion (wall thickness) | Wall thickness of 270° | Smoothing |
| Example 1 | ±20° | 250° and 290° (0.28) | 0.24 | Cos function (250° to 290°) |
| Example 2 | ±30° | 240° and 300° (0.32) | 0.30 | Cos function (240° to 300°) |
| Example 3 | ±20° | 250° and 290° (0.28) | 0.22 | Cos function (250° to 290°) |
| Example 4 | ±20° | 250° and 290° (0.25) | 0.17 | Cos function (250° to 290°) |
| Comparative example 1 | 0° | 270° | 0.28 | None |
| Comparative example 2 | ±10° | 260° and 280° (0.32) | 0.30 | Cos function (260° to 280°) |
| Comparative example 3 | ±40° | 230° and 310° (0.27) | 0.23 | Cos function (230° to 310°) |
| Comparative example 4 | ±20° | 250° to 290° (0.29) | 0.29 | Cos function (250° to 290°) |
| Comparative example 5 | ±20° | 250° and 290° (0.28) | 0.24 | Linear function (250° to 290°) |

TABLE 2

| | |
|---|---|
| Spherical lens power (SPower) | −3.00 D |
| Cylindrical lens power (CPower) | −0.90 D |
| Cylindrical axis (Aix) | 180° |
| Base curve (BC) | 8.5 |
| Diameter (Dia) | 13.8 |

Similarly to the contact lens 10 of an embodiment, the toric contact lens of examples 1 to 4 has a valley-shaped recess at a position of 270°, being the lens lower end portion. Namely, the thickness is gradually reduced toward the lens lower end portion 26 from the maximum thickness portion 36 and the maximum thickness portion 38 at right and left both sides.

The toric contact lens of example 1 corresponds to the toric contact lens 10 of the aforementioned embodiment. Further, the toric contact lens of example 2 is designed based on the toric contact lens of example 1 so that the development angle of the slab-off 40 is set to ±30°. Further, contact lens 10 of example 1 so that the development angle of the slab-off 40 is set to ±40°, wherein the valley V between right and left both maximum thickness portions is wider than the toric contact lens of example 3 is designed based on the toric contact lens 10 of example 1 so that the thickness at the position of 270° is smaller than the thickness of example 1. Further, the toric contact lens of example 4 is designed based on the toric contact lens 10 of example 1 so that the thickness at the position of 270° is smaller than the thickness of example 3.

Meanwhile, the toric contact lens of comparative example 1 is the toric contact lens having a so-called conventional prism ballast structure in which the maximum thickness portion exists at 270°, being the lens lower end portion 26, and the thickness is gradually increased toward the lens lower end portion 26 from the lens upper end portion 24. Further, the toric contact lens of comparative example 2 is the toric contact lens designed based on the toric contact lens 10 of example 1 so that the development angle of the slab-off 40 is set to ±10°, wherein the valley V between the right and left maximum thickness portions is narrower than the valley V of examples 1 to 4. Further, the toric contact lens of comparative example 3 is the toric contact lens designed based on the toric the valley V of examples 1 to 4. Further, the toric contact lens of comparative example 4 is the toric contact lens designed based on the toric contact lens 10 of example 1 so that the development angle of the slab-off 40 is set to ±40°, wherein the maximum thickness portion is formed to be uniform from the position of 250° to the position of 290°. Further, the toric contact lens of comparative example 5 has a continuously constant thickness from the maximum thickness portion 36 to the maximum thickness portion 38.

A wearing test was conducted to right eyes of five testees of different ages. An axis position in 15 minutes and 30 minutes after wearing was confirmed, and results thereof were shown in table (a). Note that table 3(b) is a description of symbols shown in (a).

TABLE 3

| | | (a) | | | | | |
|---|---|---|---|---|---|---|---|
| | | Wearer | | | | | |
| Examples | time(min) | Forties | Forties | Thirties | Thirties | Twenties | Average |
| Example 1 | 15 | ○ | Δ | Δ | Δ | ○ | 8.2 |
| | 30 | ○ | Δ | ○ | ○ | ○ | 9.4 |
| Example 2 | 15 | ○ | Δ | ▲ | ○ | ○ | 8 |
| | 30 | Δ | Δ | ○ | ○ | ○ | 8.8 |
| Example 3 | 15 | Δ | Δ | ○ | ○ | ○ | 8.8 |
| | 30 | ○ | ○ | ○ | ○ | ○ | 10 |

TABLE 3-continued

| Example 4 | 15 | X | Δ | ▲ | X | ○ | 3.2 |
|---|---|---|---|---|---|---|---|
| | 30 | ○ | ○ | ○ | ○ | ○ | 10 |
| Comparative example 1 | 15 | Δ | ○ | ▲ | ▲ | ○ | 6.6 |
| | 30 | ○ | Δ | ▲ | ▲ | Δ | 6 |
| Comparative example 2 | 15 | ▲ | ○ | ▲ | ○ | ○ | 7.2 |
| | 30 | Δ | Δ | ▲ | ○ | ○ | 7.4 |
| Comparative example 3 | 15 | X | ▲ | ▲ | ▲ | Δ | 1.6 |
| | 30 | X | Δ | ▲ | Δ | Δ | 4.2 |
| Comparative example 4 | 15 | ○ | Δ | Δ | Δ | ○ | 8.2 |
| | 30 | ○ | ○ | ▲ | Δ | ○ | 8 |
| Comparative example 5 | 15 | Δ | X | ○ | ○ | ○ | 7.4 |
| | 30 | ○ | X | ○ | ○ | ○ | 8 |

(b)
Deviation of axis from 270° position (P3)

| Symbols | Scores | Deviation of axis |
|---|---|---|
| ○ | 10 | 0° or more and less than ±10° (260° to 280°) |
| Δ | 7 | ±10° or more and less than ±20° (250° to 260°, 280° to 290°) |
| ▲ | 3 | ±20° or more and less than ±30° (240° to 250°, 290° to 300°) |
| X | 0 | ±30° or more (0° to 240°, 300° to 360°) |

Figure 7:
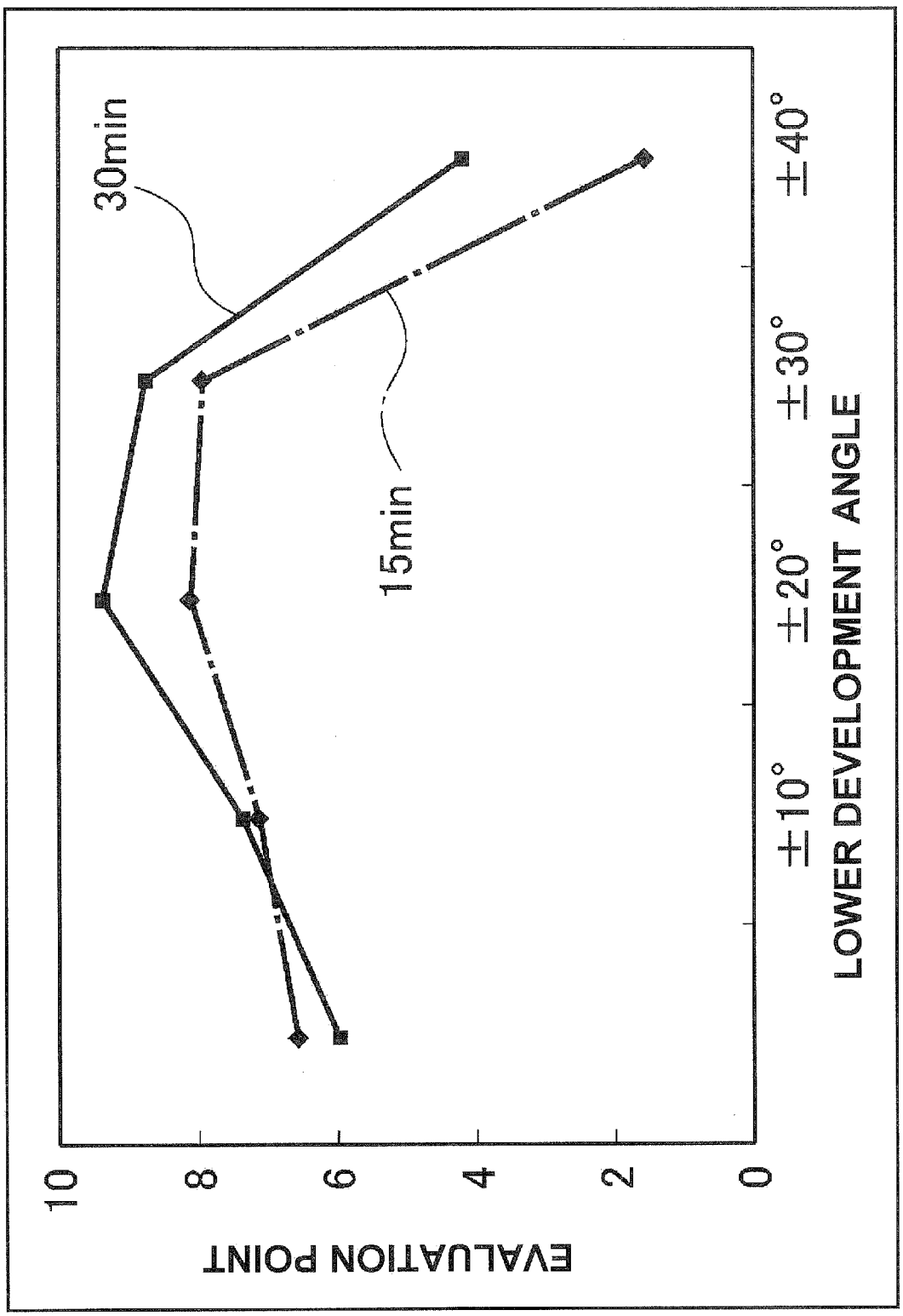
FIG. 7 is a view showing a result of a test regarding a difference in development angles of the maximum thickness portions of a lens lower portion.
Figure 8:
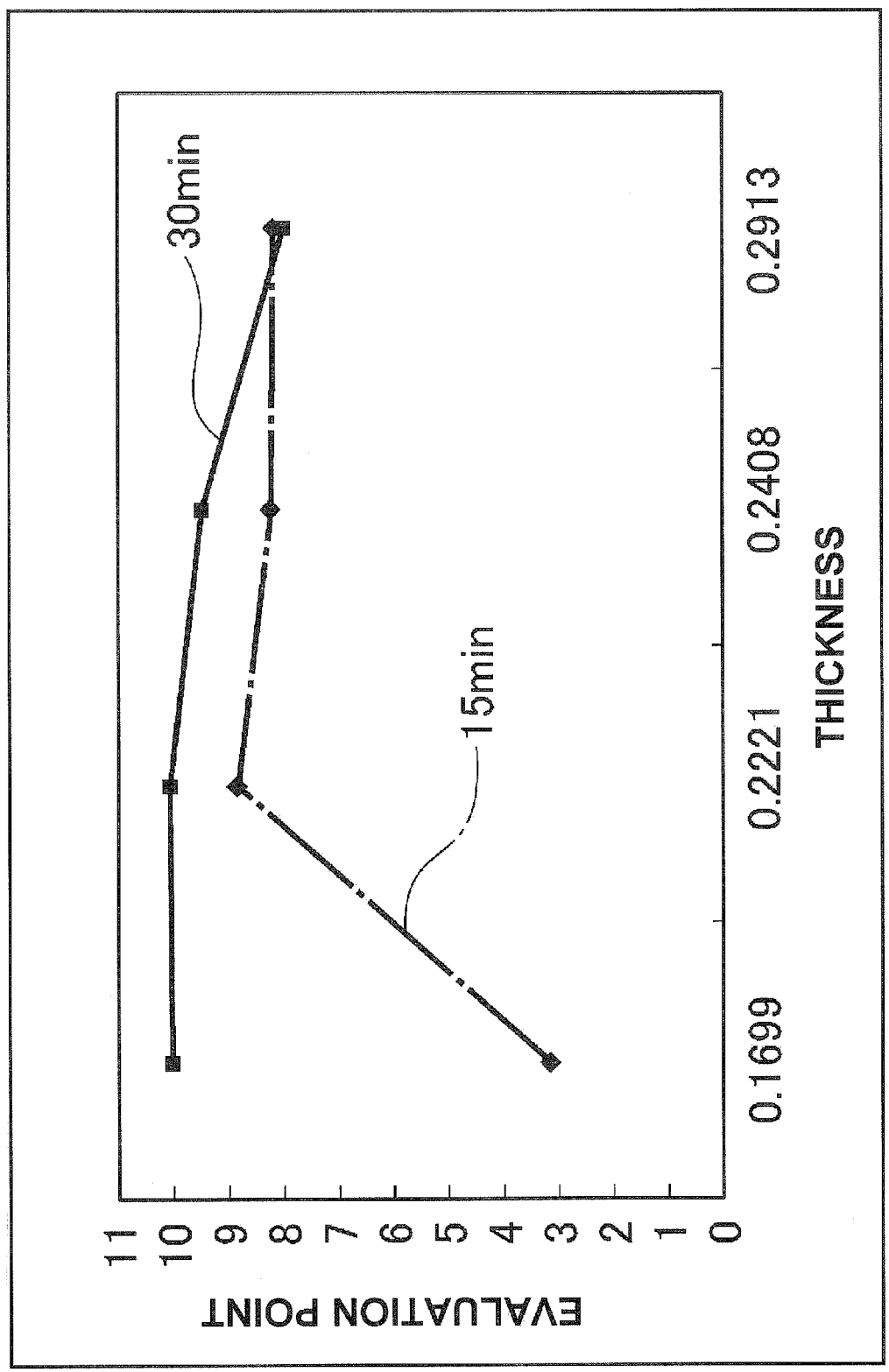
FIG. 8 is a view showing a test result regarding a difference in thicknesses of the lens lower end portion.
Figure 9:
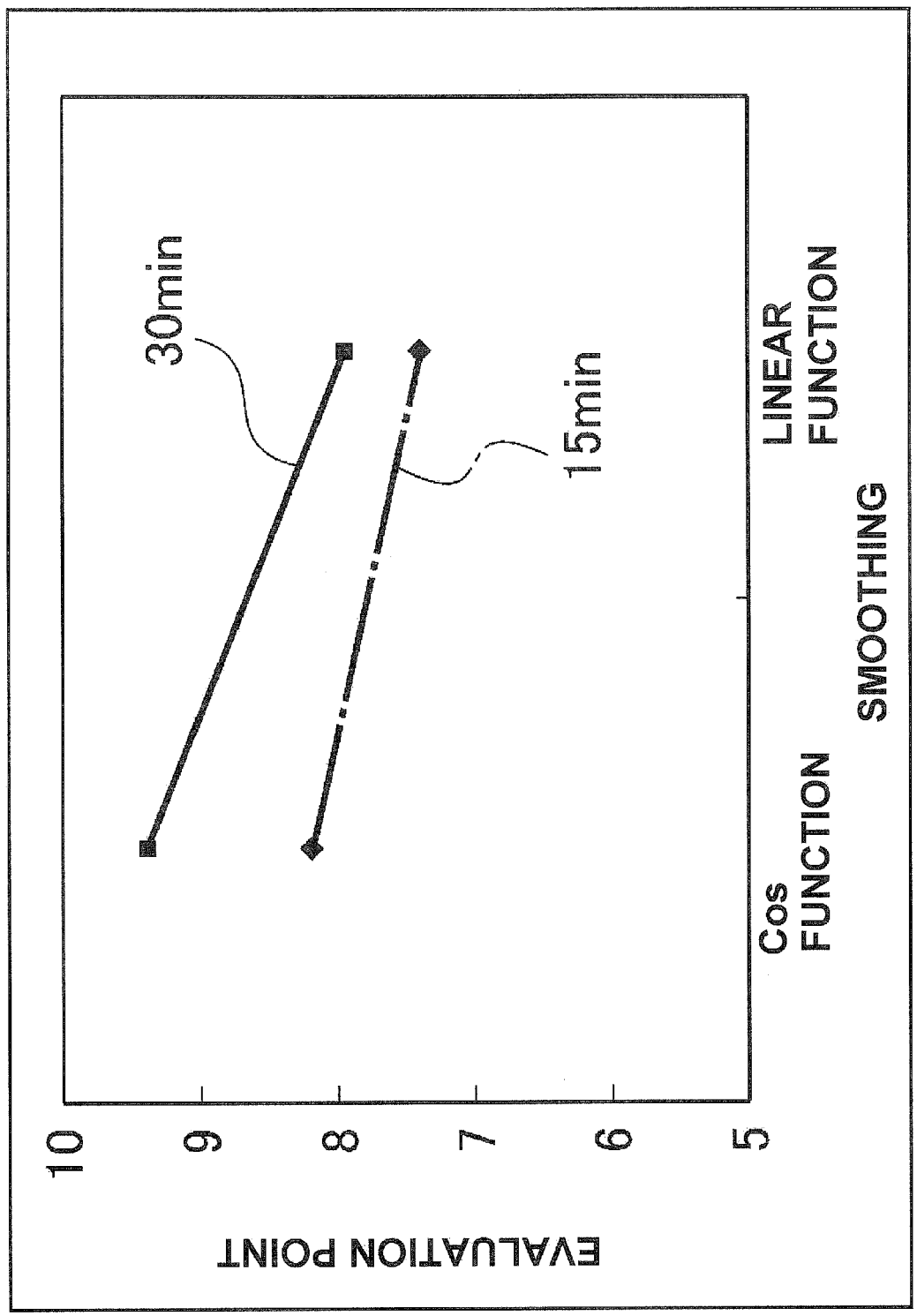
FIG. 9 is a view showing a test result regarding a difference in thickness shapes of the lens lower end portion.

When an effect of the maximum thickness portion 36, the maximum thickness portion 38, and the development angle of the slab-off 40, given to the axis stability, was confirmed, it was found that superiority of the axis stability was remarkably exhibited in the vicinity of ±20° to ±30° of the lower development angle of the slab-off 40, as shown in table 4, and FIG. 7 showing a graph dividing the thickness in each development angle of the slab-off 40.

TABLE 4

| Lower development angle | | | | | | | | | | |
|---|---|---|---|---|---|---|---|---|---|---|
| 0° | | ±10° | | ±20° | | ±30° | | ±40° | | |
| Examples | | | | | | | | | | |
| Comparative example 1 | | Comparative example 2 | | Example 1 | | Example 2 | | Comparative example 3 | | |
| Time(min) | | | | | | | | | | |
| 15 | 30 | 15 | 30 | 15 | 30 | 15 | 30 | 15 | 30 | |
| Evaluation point | 6.6 | 6 | 7.2 | 7.4 | 8.2 | 9.4 | 8 | 8.8 | 1.6 | 4.2 |

Further, when the effect of the thickness near the lens lower end portion 26, to the axis stability is confirmed, it can be considered that the axis stability is improved, because the toric contact lens 10 is easily fit in to the shape shaped by the friction generated by the cornea and the upper and lower eyelids.

TABLE 5

| Examples | | | | |
|---|---|---|---|---|
| Example 4 | Example 3 | Example 1 | Comparative example 4 | |
| Measurement (mm) | | | | |
| 0.1699 | 0.2221 | 0.2408 | 0.2913 | |
| Time(min) | | | | |
| 15 | 30 | 15 | 30 | 15 | 30 | 15 | 30 |
| Evaluation point | 3.2 | 10 | 8.8 | 10 | 8.2 | 9.4 | 8.2 | 8 |

Further, when the effect of the smoothing (degree of the decrease in the thickness) in the slab-off 40, to the axis stability was confirmed, it was found that the axis stability was good in a shape that the thickness was decreased based on Cos function, compared with a shape that the thickness was decreased based on linear function. It can be considered that this is because the axis stability is reduced because the slab-off 40 is easily loosened when the thickness is decreased based on linear function from P2 (250°, 290°) to P3 (270°).

TABLE 6

| | Examples | | | |
|---|---|---|---|---|
| | Example 1 | | Comparative example 5 | |
| | Smoothing | | | |
| | Cos function (250° to 290°) | | Linear function (250° to 290°) | |
| Time (min) | 15 | 30 | 15 | 30 |
| Evaluation point | 8.2 | 9.4 | 7.4 | 8 |

When the aforementioned results are summarized, it is found that the effect of the axis stability is remarkably exhibited when the maximum thickness portion positioned at a vertex of the lower development angle is in a range of ±20° to ±30° (preferably ±20°), and the effect of the axis stability is remarkably exhibited when the thickness is decreased at the position of 270°. The thickness is smoothly decreased from the two maximum thickness portions 36 and 38 disposed on the lens front surface having the mirror image symmetry, to the lens lower end portion 26, and the valley-shaped slab-off 40 is formed between the maximum thickness portion 36 and the maximum thickness portion 38 at the front curve 14. As a result, the effect of the axis stability caused by the shape of the cornea of a wearer can be reduced. Thus, the stability of the axis of the toric contact lens can be secured. Further, by forming the valley-shaped recess on the lens lower end portion 26, the toric contact lens 10 is fit into the cornea even if the lower portion of the cornea is swelled, and good wearing feeling can be obtained by good fitting of the lens to the cornea. In short, it is apparent that the toric contact lens of examples 1 to 4 is more superior than the toric contact lens of comparative examples 1 to 5.

DESCRIPTION OF SINGS AND NUMERALS

10 Toric contact lens
12 Lens back surface (base curve)
14 Lens front surface (front curve)
16 Edge 18 Vertical meridian
20 Horizontal meridian
22 Angle meridian
24 Lens upper end portion
26 Lens lower end portion
28, 34 Center optical area
30 Transition area
32 Peripheral area
36, 38 Maximum thickness portion
40 Slab-off
A Boundary (circumference)
O Lens middle point
L1 Central axis line of lens front surface
L2 Central axis line of lens back surface
V Valley
S Wall thickness

What is claimed is:

1. A toric contact lens, comprising:
a convex-shaped lens front surface and a concave-shaped lens back surface; and
a prism ballast structure in which a thickness is gradually increased from a lens upper end portion to a lens lower end portion,
wherein a center optical area determining a refractive degree, an annular transition area surrounding the center optical area, and an annular peripheral area surrounding the transition area are defined on the lens front surface, and a shape of the lens front surface has a mirror image symmetry with respect to a vertical radial line as a boundary from the lens upper end portion to the lens lower end portion passing through a lens middle point,
two maximum thickness portions where the lens thickness becomes maximum are formed on a lower side of the lens middle point of the lens front surface,
a valley-shaped recess in such a manner that the thickness is smoothly decreased between the two maximum thickness portions is formed toward the lens lower end portion, and
a width of the valley-shaped recess in a horizontal direction is narrowed toward the lens lower end portion.

2. The toric contact lens according to claim 1, wherein an angle measured in a circumferential direction of the lens from the two maximum thickness portions to the lens lower end portion is in a range of 15° to 35°.

3. The toric contact lens according to claim 1, wherein variation of the thickness that decreases from the maximum thickness portions to the lens lower end portion is defined by a cosine function.

4. The toric contact lens according to claim 1, wherein the prism ballast structure is formed by an offset of a central axis line of the lens front surface downward with respect to a central axis line of the lens back surface.

5. The toric contact lens according to claim 1, wherein the center optical area is set in a bifocal shape or in a multifocal shape.

6. The toric contact lens according to claim 1, wherein the toric contact lens is made of a hydrogel material or a silicone hydrogel material.

7. The toric contact lens according to claim 1, wherein a thickness of the maximum thickness portion and a thickness of the lens upper end portion satisfy a relation of "the thickness of the maximum thickness portion: the thickness of the lens upper end portion=2.27-2.54:1".

8. The toric contact lens according to claim 1, wherein a thickness of the maximum thickness portion and a thickness of the lens lower end portion satisfy a relation of "the thickness of the maximum thickness portion: the thickness of the lens lower end portion=1-1.27:1".

9. The toric contact lens according to claim 8, wherein the thickness of the maximum thickness portion is 0.25-0.32 mm and the thickness of the lens lower end portion is 0.17-0.30 mm.

10. The toric contact lens according to claim 1, wherein a thickness of the lens upper end portion and a thickness of the lens lower end portion satisfy a relation of "the thickness of the lens upper end portion:the thickness of the lens lower end portion=1-2.27:1".

11. The toric contact lens according to claim 1, wherein the valley-shaped recess includes a portion in which the thickness is smoothly decreased from the lens lower end portion toward the lens middle point in the annular peripheral area.

12. A method for manufacturing a toric contact lens having a convex-shaped lens front surface and a concave-shaped lens back surface; and a prism ballast structure in which a thickness is gradually increased from a lens upper end portion to a lens lower end portion, the method comprising:
defining on the lens front surface, a center optical area for determining a refractive degree, an annular transition area surrounding the center optical area, and an annular peripheral area surrounding the transition area;
giving a mirror image symmetry to a shape of the lens front surface, with a vertical meridian as a boundary which extends from the lens upper end portion to the lens lower end portion passing through a middle point of a lens; and
disposing two maximum thickness portions where a lens thickness is maximum on a lower side of the middle point of the lens on the lens front surface, wherein;
the two maximum thickness portions where the lens thickness becomes maximum are formed on a lower side of the lens middle point of the lens front surface;
a valley-shaped recess in such a manner that the thickness is smoothly decreased between these two maximum thickness portions is formed toward the lens lower end portion; and
a width of the valley-shaped recess in a horizontal direction is narrowed toward the lens lower end portion.

* * * * *